United States Patent [19]

Ronconi et al.

[11] Patent Number: 4,656,477
[45] Date of Patent: Apr. 7, 1987

[54] PERFECTIONING IN REPLY TYPE RADAR SYSTEMS, IN PARTICULAR THE SSR TYPE

[75] Inventors: Roberto Ronconi, Guidonia; Roberto Chierici, Leghorn, both of Italy

[73] Assignee: Selenia Industrie Elettroniche Associate—S.p.A., Rome, Italy

[21] Appl. No.: 427,285

[22] Filed: Sep. 29, 1982

[51] Int. Cl.⁴ .............................................. G01S 13/76
[52] U.S. Cl. ........................................ 342/39; 342/37
[58] Field of Search .................... 343/6.5 LC, 6.8 LC, 343/6.5 R, 6.8 R, 7.5; 342/6.5 R, 16 R

[56] References Cited

U.S. PATENT DOCUMENTS

| | | | |
|---|---|---|---|
| 3,171,123 | 2/1965 | Spiru | 343/7.5 |
| 3,521,281 | 7/1970 | Jewitt et al. | 343/6.8 LC |
| 3,643,256 | 2/1972 | Owen | 343/6.8 R |
| 3,735,408 | 5/1973 | Litchford | 343/6.5 LC |
| 3,956,747 | 5/1976 | Leypold et al. | 343/6.5 LC |
| 4,060,805 | 11/1977 | McConcas | 343/6.5 LC |
| 4,099,180 | 7/1978 | Kupersmith et al. | 343/6.5 R |
| 4,316,190 | 2/1982 | Cole | 343/6.5 R |
| 4,408,205 | 10/1983 | Hockham | 343/16 R |

Primary Examiner—T. H. Tubbesing
Assistant Examiner—Gilberto Barrón, Jr.
Attorney, Agent, or Firm—Karl F. Ross; Herbert Dubno

[57] ABSTRACT

The invention regards a perfectioning in reply type radar systems, in particular SSR (Secondary Surveillance Radar) or IFF (Identification Friend or Foe). The invention has as its aim that of eliminating or reducing undesired replies due to reflections from fixed obstacles or from structural peculiarities in the main radar system (i.e. radome) and other similar effects. The suppression of undesired replies is attained by varying azimuthally the emission power of the radio-frequency impulses according to a memorized law.

5 Claims, 12 Drawing Figures

FIG.4 a) RADOME

— POLAR DIAGRAM IN FREE SPACE
---- RADOME EFFECTS
◯ POSSIBLE INTERROGATION OF THE SIDE LOBES b) HORIZONTAL DIAGRAMS – SUM AND CHECK

FIG. 5 a) REFLECTION GEOMETRY b) INPUT SIGNALS AT THE TRANSPONDER

FIG. 6 a) CONVENTIONAL SIDE-LOBE-SUPPRESSION (SLS) TECHNIQUE $1/2$, $2/3$ REPRESENT THE POWER LEVEL REFERRED TO TRANSMITTER OUTPUT b) IMPROVED-INTERROGATOR SIDE-LOBE-SUPPRESSION (IISLS) TECHNIQUE c) SIGNALS IN THE "AREA": —— P1,P3
                          --- P2

FIG. 7 a) IMAGE WITH ANTIREFLECTING FUNCTION

AIRCRAFT SEEN ON THE DIRECT PATH

AIRCRAFT SEEN ON THE REFLECTED PATH SHOWS A PHANTOM RESPONSE WHEN FULL POWER IS APPLIED

A REDUCED POWER IN A SMALL SECTOR PRACTICALLY REDUCES REFLECTION.

t = REFLECTING SOURCE
S = LOW-POWER-LEVEL SECTOR
AZIMUTHAL WIDTH OF SECTOR:
2.8 DEGREES MINIMUM b) POSSIBILITY OF SUBDIVIDING IN SECTORS

PERFECTIONING IN REPLY TYPE RADAR SYSTEMS, IN PARTICULAR THE SSR TYPE

FIELD OF THE INVENTION

Our present invention regards a perfectioning in reply type radar systems, in particular the SSR (Secondary Surveillance Radar) or IFF (Identification Friend or Foe) types.

BACKGROUND OF THE INVENTION

These radar systems consist of a transponder on land (interrogator) having a system of rotating antenna and a transceiver also on an aircraft (transponder) which basically utilizes an omni-directional antenna. The interrogator positioned on land typically emits three pulses (designated hereinafter P1, P2, P3) in succession, e.g. at a frequency of 1030 MHz, with, for example, peak power levels ranging between 0,5 and 4 KW.

The time interval between the pulses P1 and P3 radiated by means of a directional antenna, is related to the particular "mode" of interrogation. Pulse P2 which presents a fixed delay with respect to pulse P1, is radiated from a so-called "control" beam of the pseudo-multi-directional type, which has the function of avoiding interrogations from the lateral lobes of the directional beam (SLS—Side Lobe Suppression).

From this it follows that, at the input of the transponder the ratio between the amplitudes of pulses P1 and P2 turns out to depend on the azimuth of the aircraft referred to the axis of the directional antenna beam.

Basically the following two cases exist:

(a) for the azimuths included in a section of the directional beam, called the "effective beam" the ratio P1/P2 is nominally greater than 9 dB;

(b) for pulses arriving from the lateral lobes of the directional beam, the ratio P1/P3 is nominally less than 0 dB.

In the first case the transponder has to reply, in the second case there normally should be no response. What has been described is subjected to international regulations (ICAO, STANAG).

In practice various malfunctions are found to occur within the system and in its interaction with the environment.

In particular:

(a) Reflecting surfaces such as airport structures, ground aircraft, buildings, ships etc. are causes of partial deviation of the directional beam whereby interrogations of aircrafts can occur outside the path of the beam.

(b) The surroundings, in particular the radome structure often used to protect the antenna systems, tend to noticeably deform in an unpredictable fashion the two antenna beams.

The ratio P1/P2 therefore appears altered and for each of the angular sectors outside the directional beam, interrogations and thus undesired responses may take place.

(c) A weakness of the SSR/IFF radars consists in the lack of angular discrimination which creates problems, especially in the "terminal" regions where an elevated air-traffic density can be encountered.

Present-day interrogators are not entirely able to overcome the problems described above.

In an "on-site" optimization procedure, efforts are generally directed to reducing the transmission power. This is achieved by means of fixed power attenuators, placed in cascade at the transmitter. In other words, the general power of the transmitter is reduced by a fixed amount and in a discriminative way with respect to the specific directions from which the disturbance is expected.

As regards the reflections, optional units exist, which operate on the transmission pulses in such a way as to make the transponder insensitive to transmission by the lateral lobes (IISLS: Improved Interrogator Side Lobe Suppression).

The aforedescribed techniques are subject to the following limitations:

(a) little efficiency;

(b) the partial blindness imposed upon the transponder tends to diminish its ability to respond to another interrogating sensor;

(c) a significant amount of hardware which either causes an appreciable loss (at least 3 dB) or requires the addition of a second transmitter.

SPECIFIC DESCRIPTION

Figure 1:
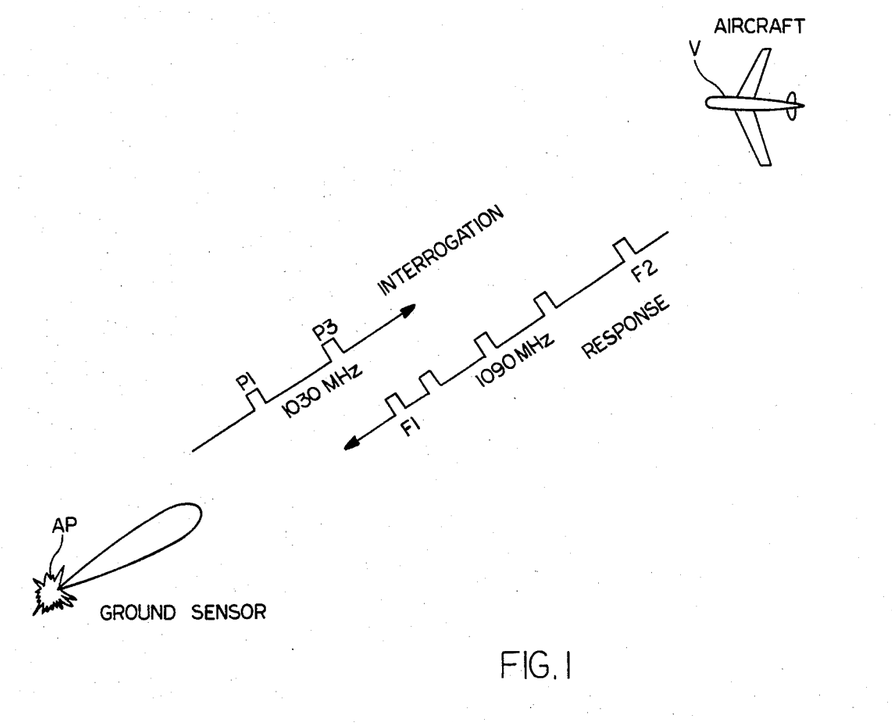
FIG. 1 shows the outgoing and return paths (up-/down link) of the signals of an SSR system.

FIG. 1 illustrates the co-operative aspect of the SSR radar. A sound sensor AP emits the interrogation and a transponder aboard an aircraft V carries out the identification and then in a positive case emits the reply on a different frequency channel.

Figure 2:
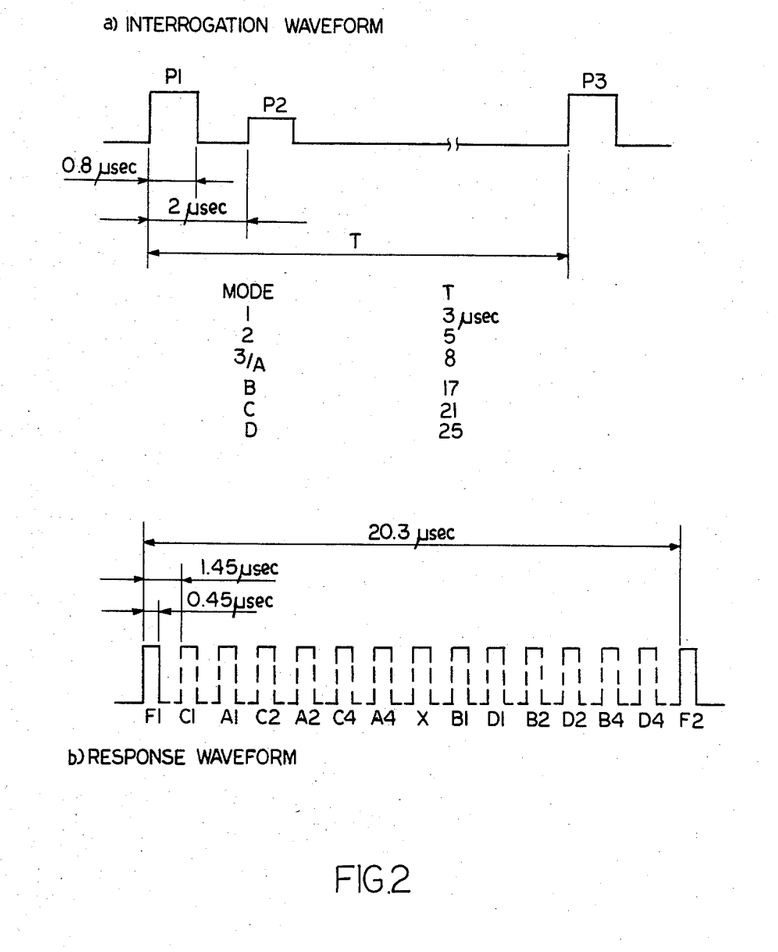
FIG. 2 shows respective waveforms of the interrogation and response signals in an SSR system.
Figure 3:
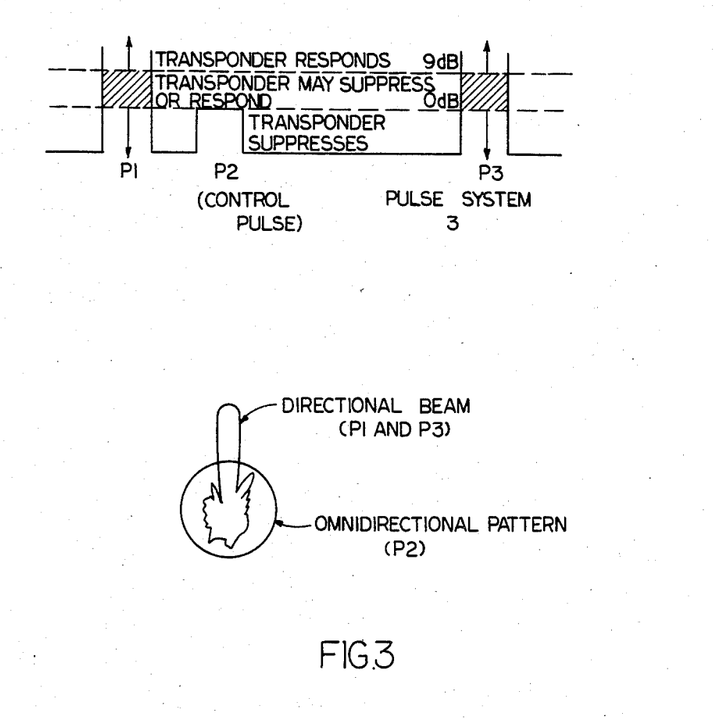
FIG. 3A shows the pulse amplitudes in a side-lobe-suppression (SLS) system.
FIG. 3B shows the associated antenna diagram.

In FIG. 2 are presented the details of the modulation waveforms associated with the interrogation and the reply. In the interrogation section of FIG. 2 the control pulse P2 will be better illustrated with reference to FIG. 3.

FIG. 3A illustrates the amplitude relationships between pulses P1, P3 and the control pulse P2 and the antenna diagrams.

FIG. 3B shows that the pulses P1 and P3 are emitted on a directional beam which includes a certain number of secondary lobes in various configurations centered on the emission point, while the pulses P2 are emitted from an antenna having an omni-directional radiation diagram (practically circular in the ground projection).

Figure 4:
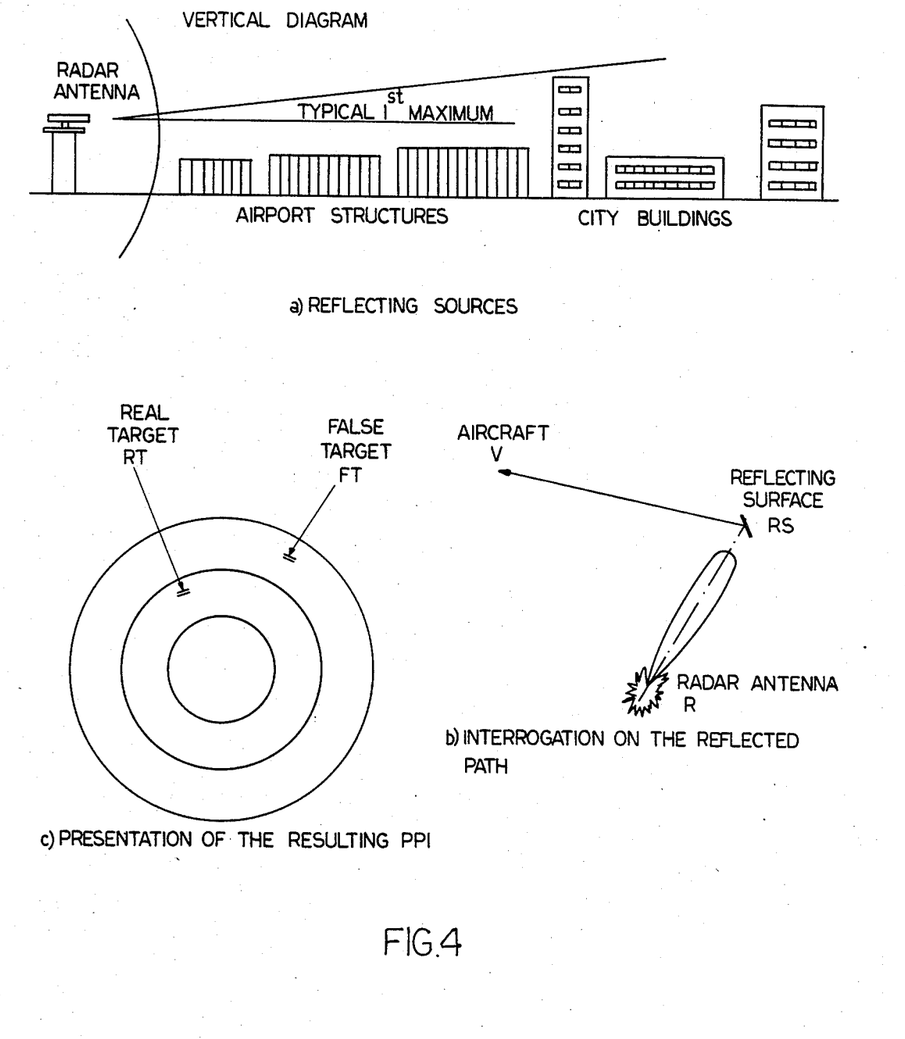
FIG. 4 shows the effects of reflections in an SSR system, in the presence of ground obstacles.

FIG. 4a illustrates the effect of reflections in the presence of airport structures, other structures and city buildings near the airport.

In FIG. 4b it is shown how in the presence of a reflecting surface RS, an aircraft V "sees" the radiation from the radar's antenna R in a different angle from the effective angle.

FIG 4c illustrates a typical PPI presentation, in these circumstances one has a real target RT and a false target FT whose presence is induced by the reflecting surface RS of FIG. 4b. This is the situation which comes about in the presence of fixed obstacles which are not part of the surveillance radar structure.

Figure 5:
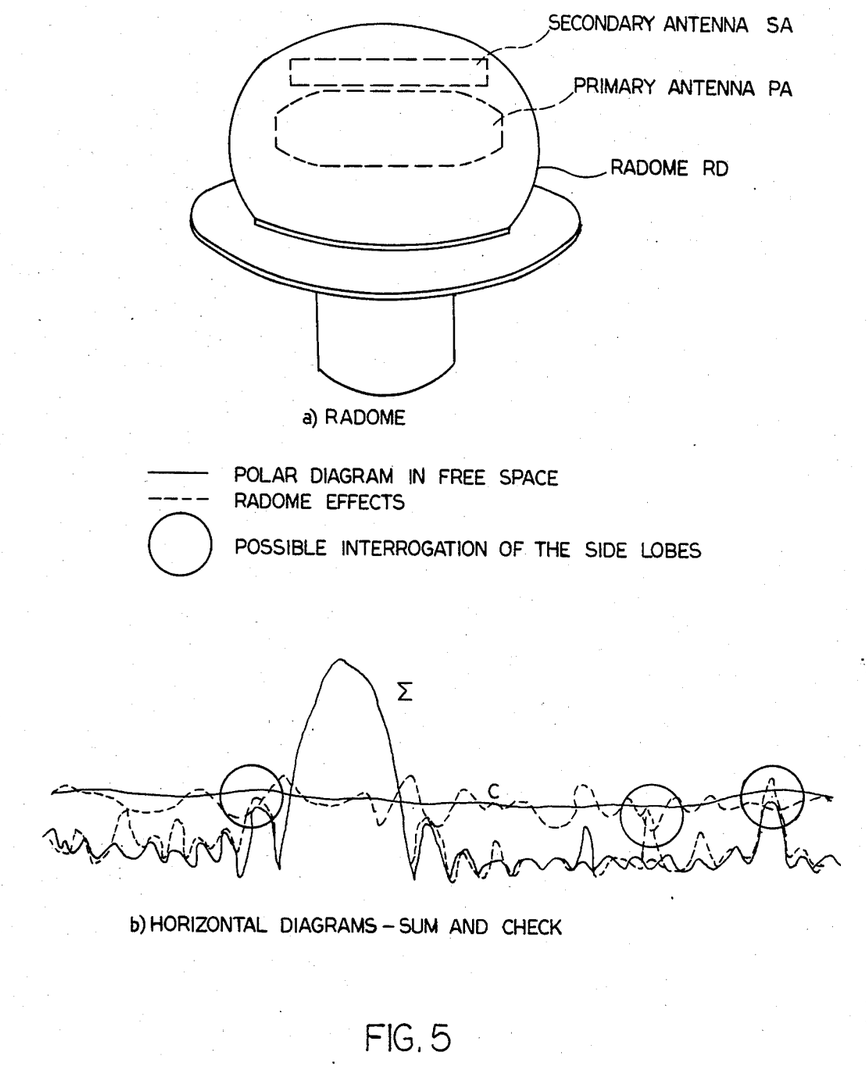
FIG. 5 shows the distortion effects due to a "radome" which induces false interrogations.

FIG. 5 shows instead the interrogation effect on behalf of the side lobes induced by distortion caused by the radome, that is, the fixed structure which normally encloses the rotating antennas. FIG. 5a illustrates a radome structure including the radome proper RD which encloses a primary antenna PA and an antenna of the secondary radar SA.

FIG. 5b illustrates in cartesian coordinates the polar diagram of the emitted signal in free space and in the presence of radome, the distortions induced by the radome, and the events of possible interrogations on behalf of the side lobes caused by the distortions introduced by the radome's fixed structure.

Figure 6:
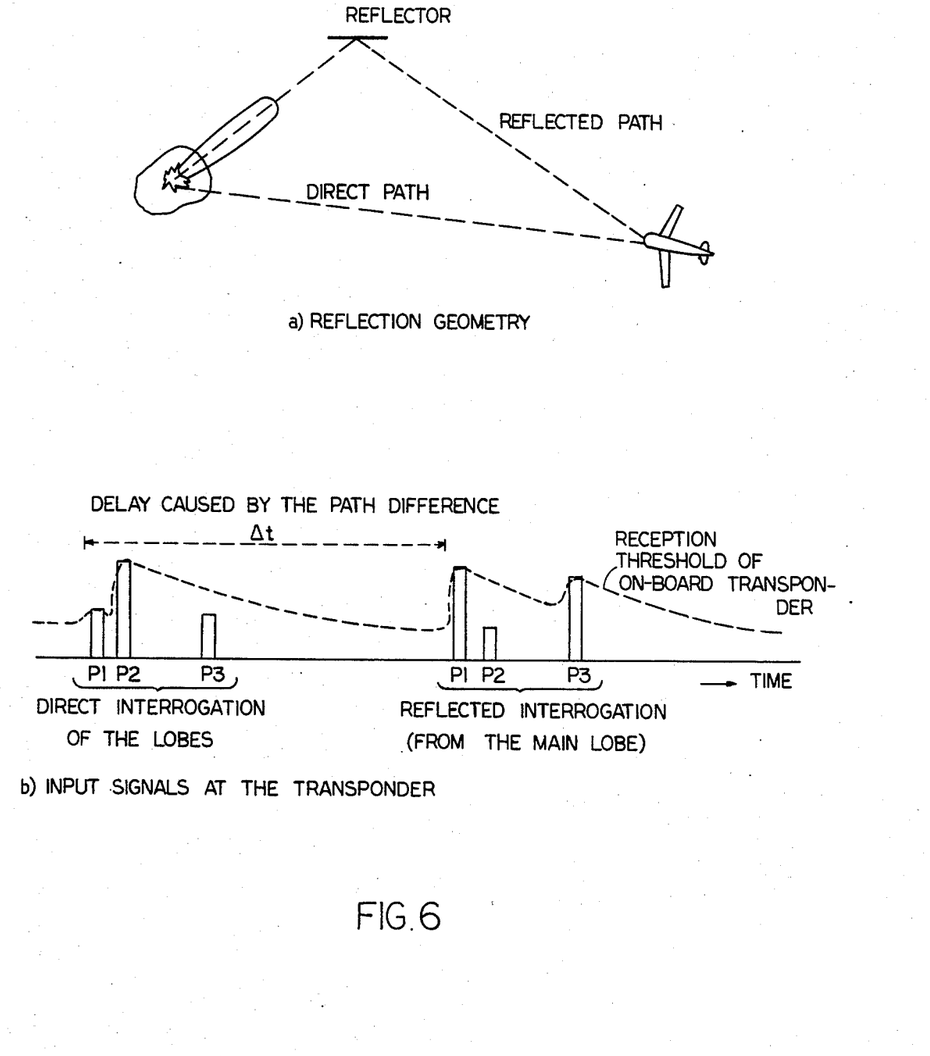
FIG. 6 shows geometric aspects associated with the phenomenon of undesired reflection interrogations.

In FIG. 6 the geometric aspects associated with the interrogation phenomenon by undesired reflections are shown. If the delay Δt is less than the nominal 35 microseconds, and the direct interrogation pulse P1 has an amplitude less than the predetermined threshold, the reflected interrogation does not give rise to a response. The first case (pulses on the left) illustrates a direct interrogation from the lobes, and the second case (pulses on the right) illustrates a reflected interrogation from the principal lobe.

Whenever the following two conditions are verified:

(a) the transponder recognizes that the first interrogation comes from the lateral lobes and this intercepts the reception; and (b) the delay of the reflected interrogation is less than the interception time interval;

then the interrogation from the reflection root will not give rise to any response. Assuming that the path difference is such as to satisfy the condition b the capability of intrinsic anti-reflection at the system results inefficient since the shape of the side lobes of the directional beam impedes the verification of condition a.

In fact, for about 80% of the azimuth directions related to the side lobes, the amplitude of the pulse P1 is so small that it is not recognized by the transponder which therefore does not detect the interrogation from the side lobes.

The IISLS technique which cannot be generalized since it is exclusively concerned with receivers which satisfy condition b consists in assuring that condition a is always verified. The action is that of increasing, artificially the level of the side lobes of the directional beam.

Figure 7:
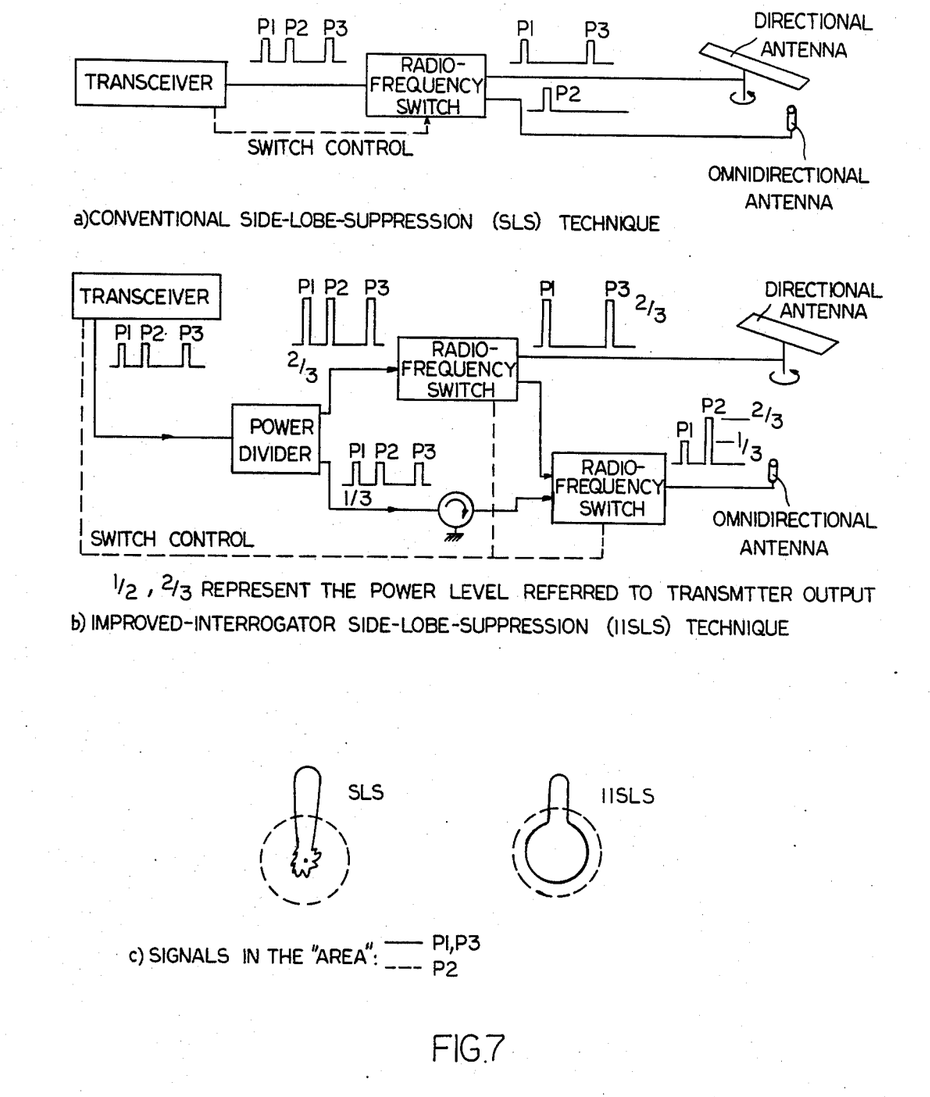
FIG. 7 shows conventional implementations (SLS, IISLS) for reducing parasitic effects.

In FIG. 7 are schematically presented the on-land sensors which are either of the conventional type or of the type equipped with IISLS (FIG. 7a and FIG. 7b). In FIG. 7c are respectively shown the radiation diagrams related to the two illustrations of FIG. 7a and FIG. 7b.

Now the solution adopted by the present invention will be described:

(a) as regards the "reflections" there is a big advantage in radiating the minimum power.

Figure 8:
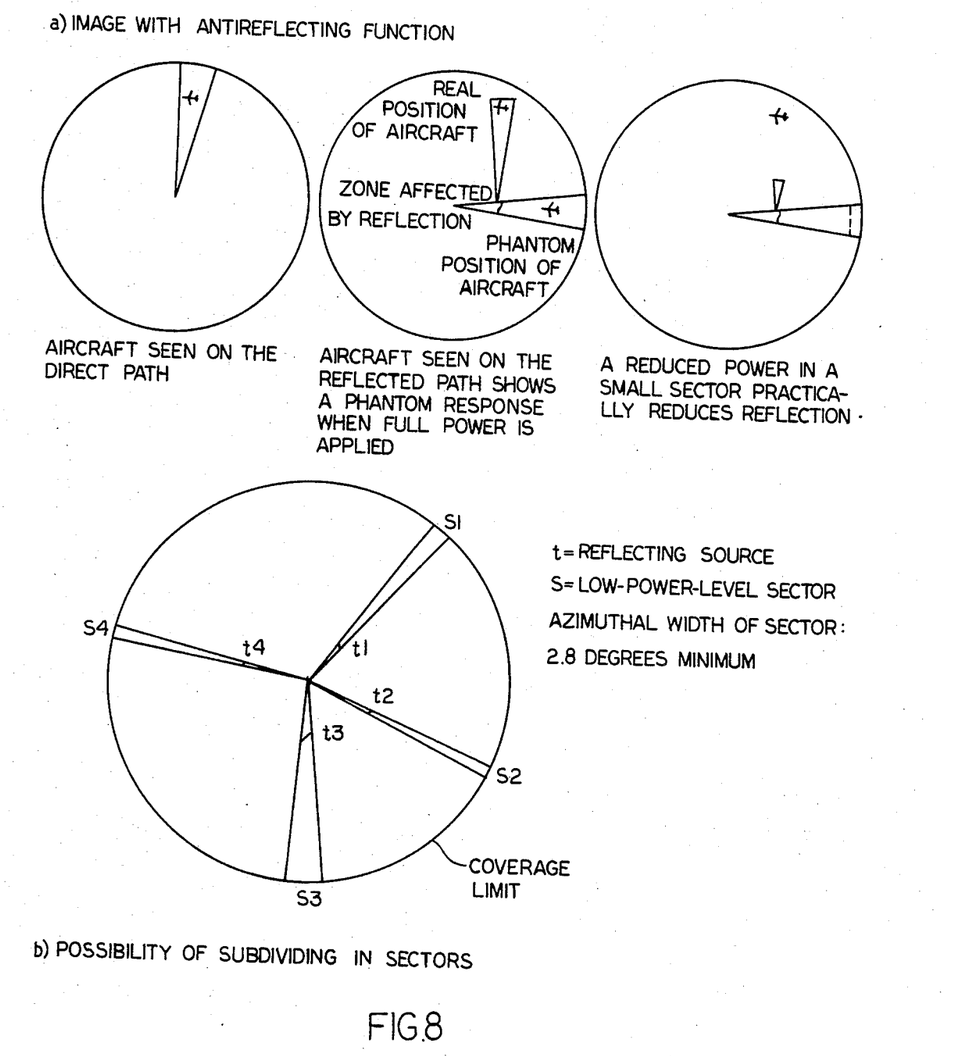
FIG. 8 schematically shows the control of the reflection effects by means of sectorialization of the radiated power.

The transmitted power in fact is generally "redundant". A reduction of the transmitted power, of the order of 3 to 6 db, does not dramatically reduce the range of the directional beam, while it drastically reduces the range of the reflected path. There are therefore ample power margins available, and this is schematically represented in the diagrams of FIG. 8. The disadvantage of this approach is in the reduced performance of the system in terms of radar cover.

It is also known that the "reflectors" occupy a relatively limited azimuthal sector (order of magnitude of the antenna beam). The technical knowledge forming the basis of the present invention therefore consists in limiting the transmission power only in the angular sectors necessary.

(b) As regards the interrogations on behalf of the side lobes, according to the present invention, it is proposed to strengthen in an additive way the level of the pulse P2 with respect to the pulses P1 and P3. If the phenomenon presents aspects of azimuthal stationarity the action can be limited only to the angular sectors of interest. The strengthening of the ratio P2/P1 is evidently realizable by means of a reduction in power associated with the pulses P1, P3. It is still evident that the safeguard of the power margins will be carried out by applying this function in a sectorial method.

(c) The same technique mentioned in the preceding paragraph (b) can be used for narrowing the effective interrogation beam and the azimuthal sectoralization can evidently also be applied.

Figure 9:
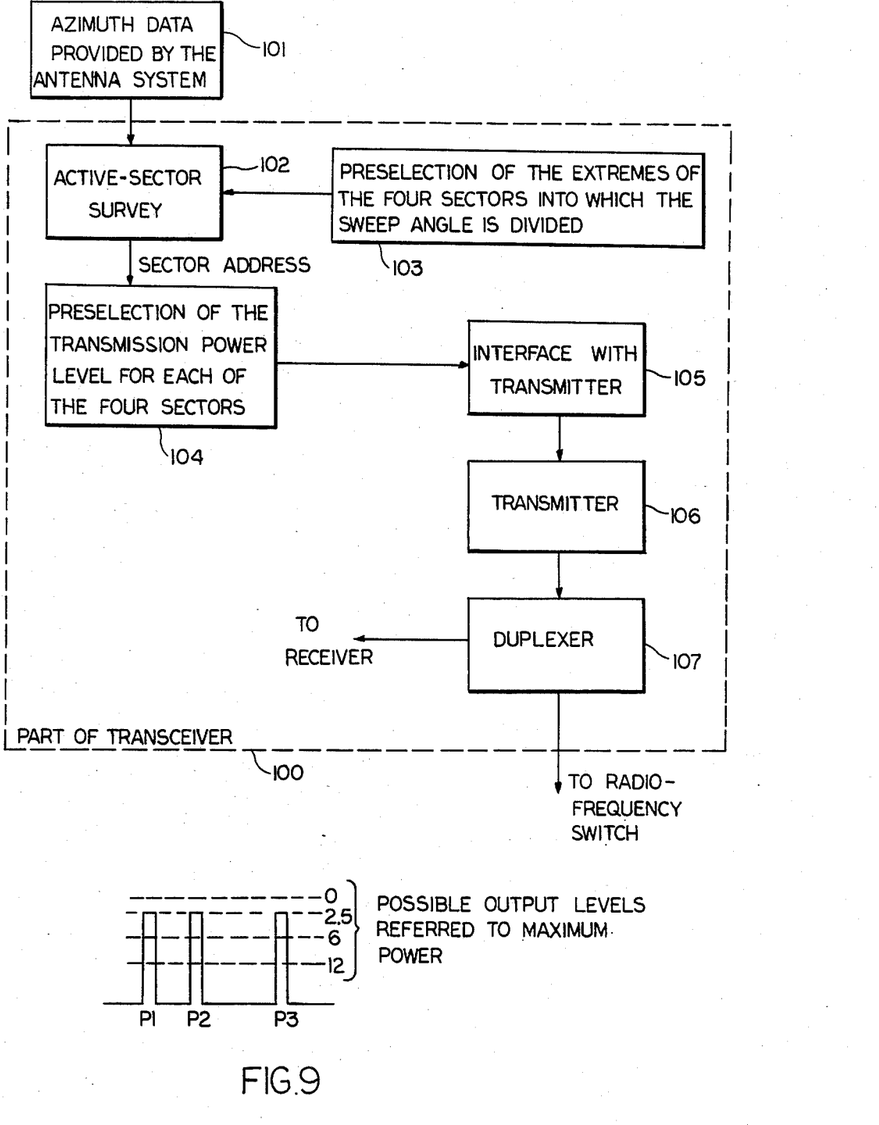
FIG. 9 shows a possible realization for controlling the transmission power by dividing of the emission sweep angle into four sectors.

Practical ways of realizing the technical knowledge of the present invention will now be described. With reference to FIG. 9, in 100 is indicated a part of the interrogation.

Block 101 is coupled to block 102 and block 101 sends azimuth data supplied by the rotation system of the directional antenna system. Block 103 is also coupled to block 102, and block 103 sends data containing the preselection of the extremes of the four sectors in which the antennas spaced turn angle is divided.

Figure 10:
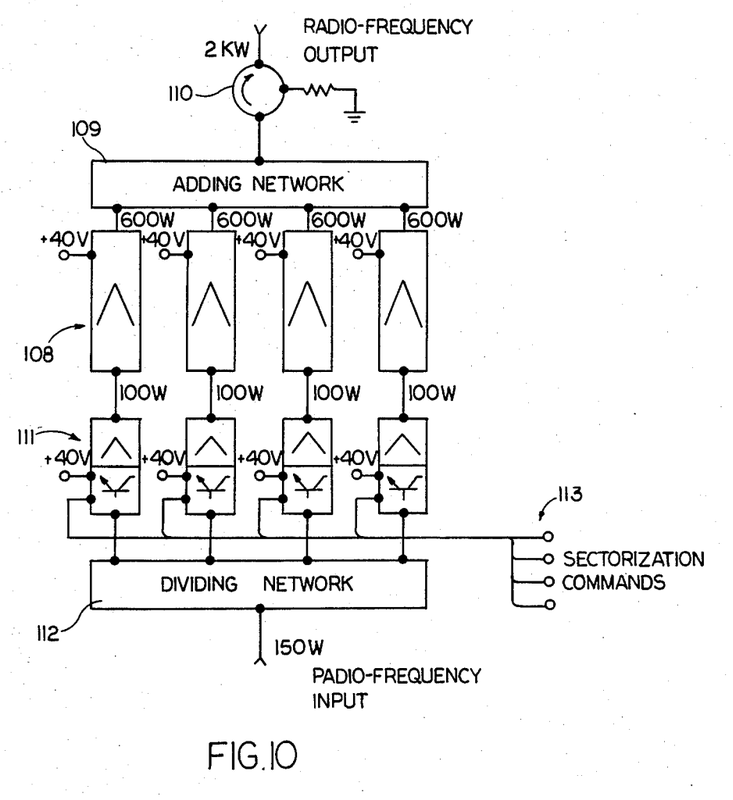
FIG. 10 is a block diagram of a transmitter implementing the technique of FIG. 9.

At the output of block 102 there is a sector address for commanding block 104 which is the preselection of the transmission power levels for each of the four sectors for which it is intended to act. The output of block 104 is coupled to an interface indicated in 105 for the command of the transmitter 106 which in turn is coupled with a duplexer 107. The structure of the transmitter is illustrated in more detail in FIG. 10. FIG. 10 illustrates four power amplification units 108 coupled to a summing network 109, whose output, by means of the circulators 110 constitutes the radio-frequency output. The units 108 are driven by amplifier stages 111 operating in class C with controllable power, biased on one side by a radio-frequency power dividing network 112. The units 111 are controllable for example by means of their direct-current supply, with numerous commands 113. Typically the commutation time is of the order of one millisecond for which the pulses constituting a message in transmission present the same level.

Figure 11:
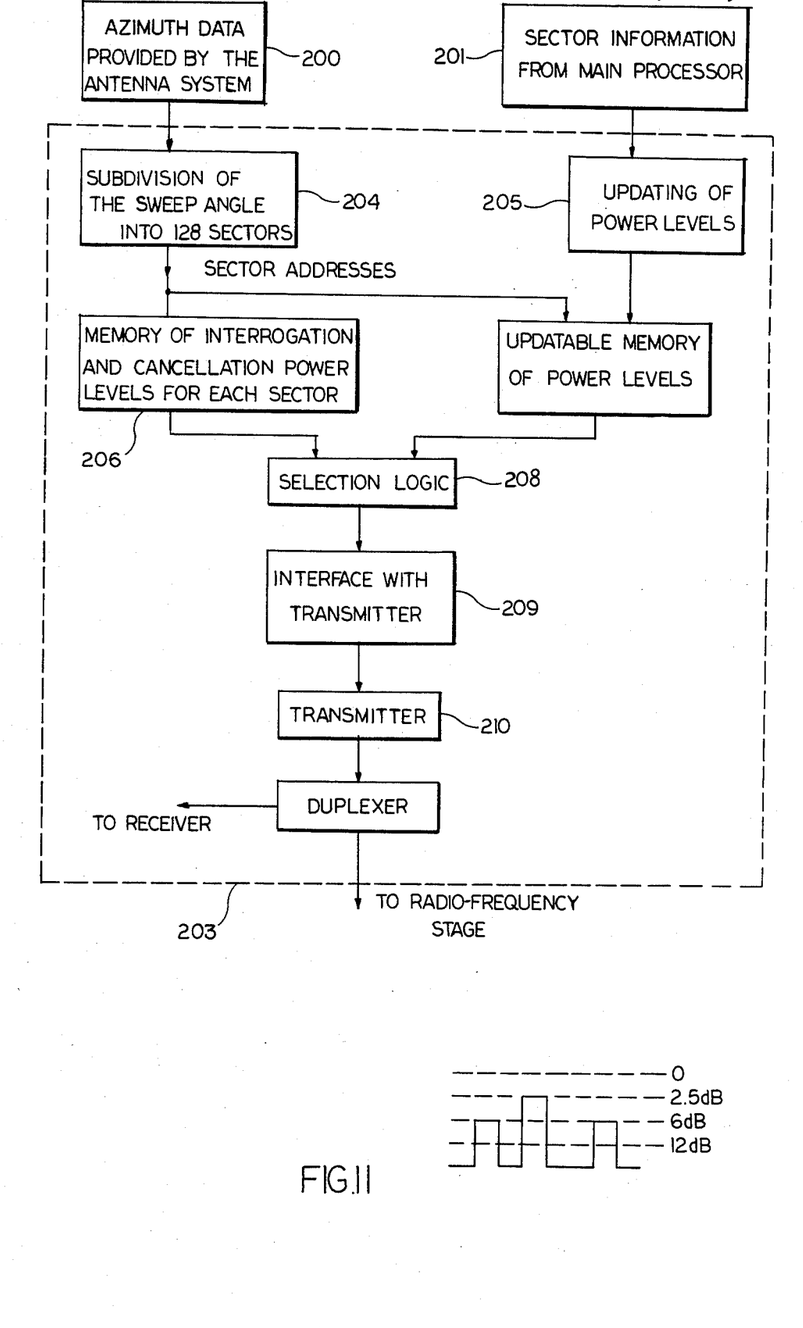
FIG. 11 shows another possible realization for controlling the transmission power by sectoring the sweep angle with reference to the interrogation and suppression pulses.

FIG. 11 illustrates another embodiment in whch the azimuth data are supplied from a block 200 and block 201 supplies data related to the sector information from a central processor of the radar system.

Block 203 constitutes part of the transceiver. Block 204 performs the subdivision of the antenna's exploration turn angle into 128 sectors. Simultaneously block 205 supplies to block 207 an up-dating of the power levels. The output of block 204 which contains the sector addresses is coupled to a first memory 206 of the interrogation and cancellation power levels for each sector. Block 204 is also coupled to block 207.

The outputs of the memories block 206 and block 207 are combined in a selection logic block 208 through and under the command of the interface block 209 which is coupled to the transmitter block 210.

Figure 12:
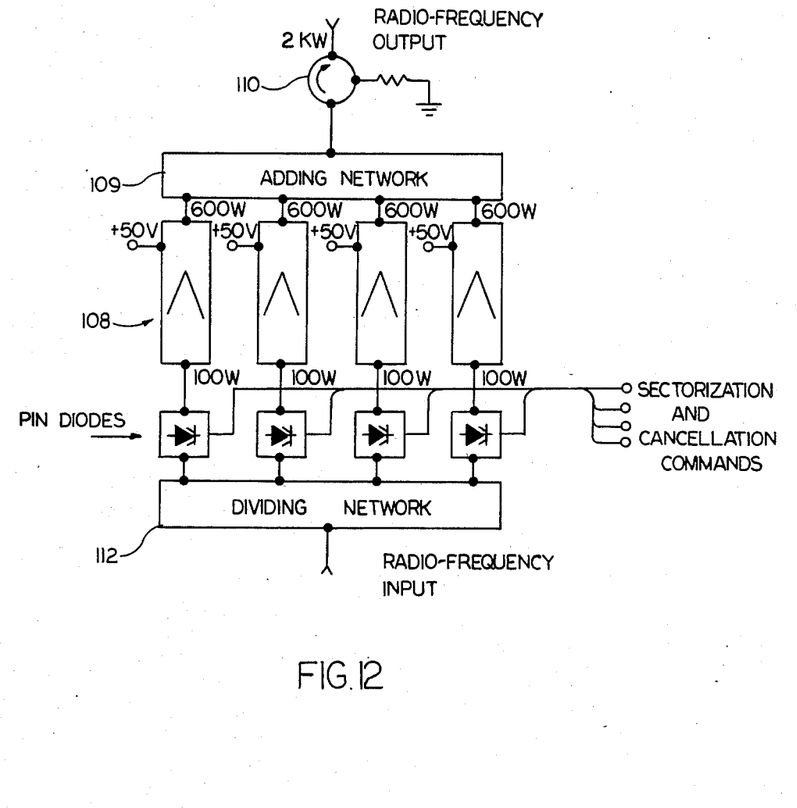
FIG. 12 is a block diagram of a transmitter implementing the technique of FIG. 11.

In FIG. 12 is shown a typical diagram of a transmitter in which are utilized PIN diode modulators for controlling the emission power.

In FIG. 12, PIN diode elements are utilized, the commutation times are extremely reduced, of the order of tenths of nanoseconds, as compared with the structure of FIG. 10. This allows a greater resolution in the power variations with the antenna rotation, and also to select in a convenient way the relative amplitudes of the various pulses P1, P2, P3 in ratio with one another.

The electronic technique of storing and processing data mentioned with reference to FIG. 9 and FIG. 11 are well known to an expert in the field and consequently it is felt unnecessary to describe them in detail.

The technical knowledge according to the present invention presents the following advantages from an operational point of view.

The techniques described earlier are "sectorially" inserted, only where needed, in such a way as to leave unaltered the performances in terms of radar coverage, in the "clear" sectors.

In the control of the "reflections" with respect to the techniques which are based on the blinding of the transponders from the side lobes of the directional antenna, one tends to diminish the interferences towards the interrogators which realize the adjacent radar coverage.

As regards the realization criterion of the transmission unit it is pointed out that with respect to alternative solutions, the solution adopted according to the present invention, permits power variations to be carried out by means of circuits which can be realized by components easily available, are economic, much contained in space take up and fully satisfying the systems exigencies mentioned, in terms of both precision and velocity (commutation time about 100 ns).

This is made possible because the commutators, operating on the radio-frequency input signals of the single amplifier modules, must control power levels which are less, to those nominally emitted from the transmitter, by a factor equal to the product of the number of active elements in parallel and their gain. In practical situations, this quantity is between 25 and 50.

The present invention has been described with reference to two embodiments, but it is clear that in practice variations or modifications can be carried out by an expert in the field.

What is claimed is:

1. In a reply type radar system having an interrogator on land and a transponder aboard an aircraft the combination which comprises:
   a directional antenna for scanning azimuthally through 360 degrees;
   azimuth means for determining said azimuth of said direction antenna;
   an omni-directional antenna said omni-directional antenna and said directional antenna forming the only antennas of said radar system on land; and
   a first circuit coupled to said directional antenna and said omni-directional antenna and said first circuit comprising:
   a dividing means for preselection of a plurality of sectors into which sweep angle is divided, a detecting means for determining which sector is active coupled to said azimuth means and said dividing means, a preselection means coupled to said detecting means selectively limiting transmission power levels for each of said plurality of sectors in accordance with reflectors in each of said plurality of sectors while continuously applying sufficient power levels ample for reply of said transponder, interface means coupled to said preselection means for controlling transmission power level, and transmitting means for transmitting a plurality of interrogation pulses and suppression pulses, wherein said power levels by said transmitting means of said plurality of pulses are in accordance to said preselection means, wherein said preselection means further comprises a memory means for storing said power levels for each of said plurality of said sectors.

2. The combination defined in claim 1 wherein said transmitting means includes a dividing network having a radio-frequency input, a plurality of controllable elements connected to said dividing network and triggerable selectively to select the respective power levels, respective amplifiers connected to said elements, and an adder connected to all of said amplifiers for outputting a radiofrequency signal.

3. The combination defined in claim 2 wherein said elements are PIN diodes.

4. A method for the suppression of undesired replies due to reflections of fixed obstacles or due to radar system structure of a reply type reader system having an interrogator on land and a transponder aboard an aircraft comprising:
   scanning azimuth with a single directional antenna through 360 degrees;
   dividing sweep angle of said directional antenna into a plurality of sectors;
   selectively limiting transmission power levels by substantially 3 to 6 decibels while continuously supplying sufficient power levels ample for reply of said transponder in accordance with reflectors in each of said plurality of sectors;
   storing said power levels in a memory means; and
   transmitting pulses in accordance with said power levels.

5. The combination defined in claim 1 wherein said power transmission levels is limited by substantially 3 to 6 decibels.

* * * * *